United States Patent
Larsson et al.

(10) Patent No.: US 9,671,488 B2
(45) Date of Patent: Jun. 6, 2017

(54) RADAR LEVEL GAUGE WITH SIGNAL DIVISION

(71) Applicant: Rosemount Tank Radar AB, Gothenburg (SE)

(72) Inventors: Lars Ove Larsson, Linkoping (SE); Mikael Kleman, Vreta Kloster (SE)

(73) Assignee: Rosemount Tank Radar AB, Gothenburg (SE)

( * ) Notice: Subject to any disclaimer, the term of this patent is extended or adjusted under 35 U.S.C. 154(b) by 486 days.

(21) Appl. No.: 13/796,043

(22) Filed: Mar. 12, 2013

(65) Prior Publication Data

US 2014/0266863 A1  Sep. 18, 2014

(51) Int. Cl.
| | | |
|---|---|---|
| G01S 13/08 | (2006.01) | |
| G01S 7/292 | (2006.01) | |
| G01F 23/284 | (2006.01) | |
| G01F 23/00 | (2006.01) | |
| G01S 7/35 | (2006.01) | |
| G01S 13/88 | (2006.01) | |

(52) U.S. Cl.
CPC .......... *G01S 7/292* (2013.01); *G01F 23/0076* (2013.01); *G01F 23/284* (2013.01); *G01S 7/354* (2013.01); *G01S 13/88* (2013.01); *G01S 2007/356* (2013.01)

(58) Field of Classification Search
CPC .......... G01F 23/284; G01S 13/34; G01S 7/36; G01S 7/292
USPC ........................................ 342/124, 159, 162
See application file for complete search history.

(56) References Cited

U.S. PATENT DOCUMENTS

| | | | | | |
|---|---|---|---|---|---|
| 4,044,355 | A | * | 8/1977 | Edvardsson | G01S 13/343 342/124 |
| 6,107,957 | A | * | 8/2000 | Cramer | G01F 23/284 342/124 |

(Continued)

FOREIGN PATENT DOCUMENTS

EP  0 887 658 B1  8/2004

OTHER PUBLICATIONS

Notification of Transmittal of the International Search Report and the Written Opinion of the International Searching Authority from PCT/EP2014/054746, dated Jul. 1, 2014.

*Primary Examiner* — Marcus Windrich
(74) *Attorney, Agent, or Firm* — Westman, Champlin & Koehler, P.A.

(57) ABSTRACT

A method for providing narrow-band interference unaffected measurement of a distance to a surface of a product kept in a tank, comprising mixing a return signal with a transmit signal to provide an intermediate frequency signal, and determining the distance, based on the intermediate frequency signal. The step of determining the distance further comprises dividing the intermediate frequency signal into a plurality of frequency portions, wherein each frequency portion corresponds to a frequency interval of the transmit signal, identifying disturbed frequency portions as frequency portions affected by narrow-band interference, and determining the distance based on frequency portions being unaffected by narrow-band interference. By dividing the IF-signal into frequency portions corresponding to frequency intervals of the transmit signal, frequency intervals where narrow-band interferences are present may be detected.

19 Claims, 3 Drawing Sheets

(56) References Cited

U.S. PATENT DOCUMENTS

| | | | |
|---|---|---|---|
| 7,486,226 B2* | 2/2009 | Edvardsson | G01F 23/284 324/600 |
| 7,710,314 B2* | 5/2010 | Benari | G01S 7/4052 342/124 |
| 2002/0027522 A1* | 3/2002 | Tullsson | G01S 7/023 342/196 |
| 2007/0085729 A1* | 4/2007 | Edvardsson | G01F 23/284 342/124 |
| 2007/0120731 A1* | 5/2007 | Kelly, Jr. | G01S 7/021 342/159 |
| 2010/0070208 A1* | 3/2010 | Sai | G01F 23/284 702/55 |
| 2010/0223019 A1* | 9/2010 | Griessbaum | G01F 23/284 702/75 |
| 2013/0314275 A1* | 11/2013 | Fredriksson | G01F 23/284 342/124 |

\* cited by examiner

RADAR LEVEL GAUGE WITH SIGNAL DIVISION

FIELD OF THE INVENTION

The present invention relates to a radar level gauge using electromagnetic waves to determine a distance to a surface of a product in a tank. The invention further relates to a method for determining a distance to a surface of a product in a tank.

BACKGROUND OF THE INVENTION

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 24-27 GHz, or 9-11 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. Due to the linear sweep, this difference frequency, also referred to as an intermediate frequency (IF), is proportional to the distance to the reflecting surface. The mixer signal is often referred to as an IF signal.

Since the development of FMCW, other types of level gauges have been developed, where also the frequency of a transmit signal is varied within a certain range. Although highly accurate, these FMCW-type radar level gauges may be affected by narrow-band interferences from a number of sources e.g., microwave-resonances in the antenna, microwave-resonance in other parts of the waveguide, low signal amplitude due to turbulent surfaces of the content to be measured, bad assembly of the parts of the radar level gauge or contamination of the waveguides by the contents of the tank.

Consequently there is a need to provide a radar level gauge which is able to adapt to narrow-band interferences from at least the sources mentioned previously.

General Disclosure of the Invention

With regards to the above-mentioned desired properties of a radar level gauge, it is a general object of the present invention to enable improved performance of a radar level gauge by limiting or eliminating disturbance from narrow-band interferences.

The present invention is based upon the realization that by dividing a signal comprising information of the distance to a surface in a tank into a plurality of parts, more conclusive information may be produced instead of lost.

According to a first aspect of the present invention, these and other objects are achieved through a method for providing narrow-band interference unaffected measurement of a distance to a surface of a product kept in a tank, which method comprises transmitting electromagnetic transmit signal towards the surface, receiving electromagnetic return signal reflected at the surface, mixing the return signal with the transmit signal to provide an IF signal and determining the distance based on the IF signal. The step of determining the distance further comprises the steps of dividing the IF signal into a plurality of frequency portions where each frequency portion corresponds to a frequency interval of the transmit signal, identifying frequency portions being affected by narrow-band interference and determining the distance based on frequency portions being unaffected by narrow-band interference.

According to a second aspect of the invention the objects are also achieved through the use of a radar level gauge for narrow-band interference unaffected measurement of a distance to a surface of a product kept in a tank, which radar level gauge comprises a transmitter configured to transmit electromagnetic transmit signal towards the surface, a receiver configured to receive electromagnetic return signal reflected from the surface, a mixer configured to mix the transmit signal and the return signal to provide an IF signal and processing circuitry configured to determine the distance. The processing circuitry is also further arranged to divide the IF signal into a plurality of frequency portions where each frequency portion corresponds to a frequency interval of the transmit signal, identify frequency portions being affected by narrow-band interference and determine the distance from frequency portions being unaffected by narrow-band interference.

By dividing the IF-signal into frequency portions corresponding to frequency intervals of the transmit signal, frequency intervals where narrow-band interferences are present may be detected. By determining the distance to be measured by unaffected parts of the frequency spectrum a more accurate and/or robust measurement may be provided through the removal of erroneous measurements from an average of several measurements.

Furthermore faulty parts which may create microwave-resonances in the antenna or other parts of the waveguide may be identified as periodic narrow-band disturbances. If such a disturbance is encountered the entire radar level gauge may be replaced, and this may save cost and may also save time during maintenance fault tracing.

Moreover if a product, kept in a tank, which the distance is to be measured to exhibits/displays a turbulent surface, the amplitude of the return signal may be low due to the electromagnetic signals being reflected in other directions than the antenna. Some frequency portions may then produce improved measurement results than other frequency portions, which may provide a correct measured distance even under these conditions. In one embodiment of the invention a representative quantity is calculated from each frequency portion and disturbed frequency portions are identified based on this representative quantity. By calculating a quantity for each frequency portion there may be provided a simple way to compare frequency portions, thereby enabling identification of frequency portions which comprises narrow-band interference. For example, deviating representative quantities, which differ more than a predefined amount from a majority of the representative quantities, can be determined, and disturbed frequency portions can be identified as frequency portions associated with these deviating representative quantities.

In order to determined deviating representative quantities, the representative quantities may be sorted in order of size, and a predefined number of the largest and a predefined number of the smallest representative quantities may be identified. In this case, the most diverging representative quantities may be excluded to ensure a correct determined distance. As an example, less than or equal to half the number of representative quantities may be identified as being affected by narrow-band interference, which may keep sufficient information while maintaining a high measurement accuracy.

A comparison of each representative quantity with all other representative quantities and identifying those differing more than a predetermined amount, such as one percent, may provide additional measurement accuracy. Another option is to identify representative quantities differing more than one percent from an average of the representative quantities.

Several ways could be used to compare representative quantities, for example the difference between each representative quantity may be calculated and used, or the representative quantities may just be compared relatively.

According to another embodiment of the invention each of the plurality of frequency portions is processed to provide a frequency spectrum from each of the plurality of frequency portions. The representative quantity may then be calculated as an energy measure from each frequency spectrum.

By first processing each frequency portion to provide a frequency spectrum, and then calculating the energy from each spectrum there may be provided a way to identify frequency portions comprising narrow-band interferences. For example differences between frequency portions may become apparent as differences in energy compared between frequency spectrums.

Alternatively, each frequency portion maybe processed to calculate the representative quantity as a measure of the distance associated with each frequency portion.

Using a measure of the distance as the representative quantity is advantageous as the distance can then be determined as an average of distance measures being unaffected by narrow-band interference. Providing the distance as an average of a plurality of approximated distance which are unaffected by narrow-band interference may improve the measurement accuracy. Of course, this may be useful also if a different representative quantity is used.

Each frequency portion should have a sufficient number of samples to allow a determination of a distance to the surface. In some situations, two frequency portions may be sufficient, while other application may require four or even more frequency portions.

According to one embodiment of the invention the step of transmitting the electromagnetic transmit signal includes, transmitting the electromagnetic transmit signals as a plurality of frequency intervals. Dividing the transmit signals into frequency intervals may alleviate the need to divide the IF-signal into a plurality of frequency portions where each frequency portion corresponds to a frequency interval of the transmit signal, thereby a method which is easier to implement may be provided.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

This and other aspects of the present invention will now be described in more detail, with reference to the appended drawings showing an embodiment of the invention.

DETAILED DESCRIPTION OF THE PREFERRED EMBODIMENTS

In the present description, embodiments of the present invention are mainly described with reference to a radar level gauge having a free propagating antenna for radiating and capturing electromagnetic signal. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides, such as a still pipe, a transmission line or a probe, such as a single-line probe (including a so-called Goubau probe), a twin-line probe or a coaxial probe.

Further, in the following description, embodiments of the present invention are mainly described with reference to an FMCW radar level gauge using a stepped frequency sweep. It is noted that the present invention is advantageous in any sampled FMCW, such as a FMCW using a continuous frequency sweep.

Figure 1:
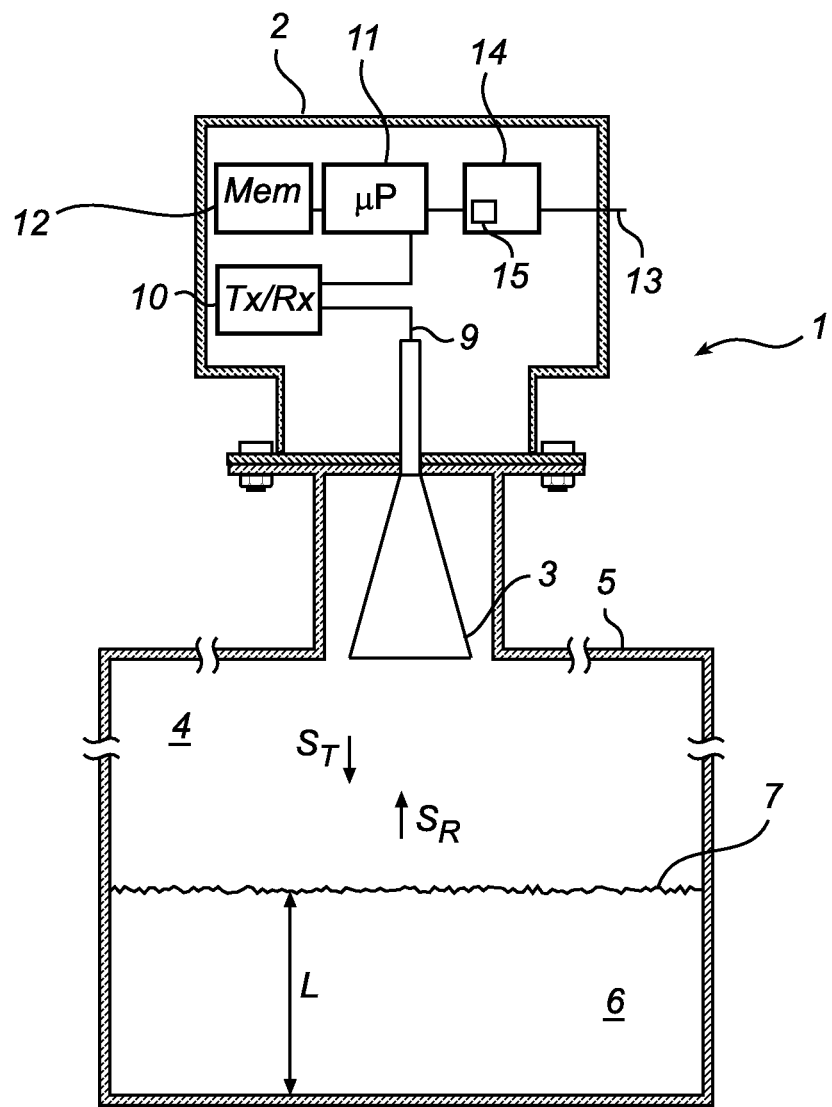
FIG. 1 is a schematic section view of a radar level gauge suitable for implementing the present invention.

FIG. 1 schematically illustrates a radar level gauge 1 according to an embodiment of the present invention, comprising a measurement electronics unit 2, and a signal propagating device, here a horn antenna 3. The radar level gauge 1 is provided on a tank 5, which is partly filled with a product 6 to be gauged. The product 6 in the tank may be a liquid, a liquid gas, or even a solid, such as grain or plastic pellets. The FMCW measurement method provides a relatively high measurement sensitivity of the radar level gauge, enabling reliable measurement results also when interfering objects are present in the tank. By analyzing transmitted signal $S_T$ being radiated by the antenna 3 towards the surface 7 of the product 6, and echo signal $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner. Furthermore the transmitted signal $S_T$ being radiated by the antenna 3 towards the surface 7, often comprises a frequency spectrum of 9 to 10.6 GHz or a frequency spectrum of 24 to 27 GHz.

As is schematically illustrated in FIG. 1, the electronics unit 2 comprises a transceiver 10 for transmitting and receiving electromagnetic signal, which here is connected to the antenna 3 via a wave guide 9. It is noted that the antenna 3 optionally may be connected directly to the transceiver circuitry, or be connected via a suitable signal medium, such as a coaxial cable, The unit 2 further comprises processing circuitry 11, which is connected to the transceiver 10 for control of the transceiver and processing of signal received by the transceiver to determine the filling level of the product 6 in the tank 5. The processing circuitry 11 is also connected to a memory 12, storing any software required for the operation of the gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. Such a two-wire interface may provide a more or less constant power, and the measurement result can be superimposed on the power voltage using a digital protocol, such as Fieldbus Foundation or HART. Alternatively, the current in the lines is regulated in accordance with the prevailing measurement result. An example of such an interface is the 4-20 mA industrial loop, where the current is regulated between 4 and 20 mA, depending on the measurement result. Alternatively, the gauge may communicate wirelessly with the control station using e.g. a Wireless HART protocol, and use a local power supply (not shown) with batteries or other means of scavenging energy for autonomous operation.

The interface 14 includes power management circuitry, including a power store 15 for storing power during periods when the microwave unit is inactive, thereby enabling higher power consumption during periods when the microwave unit is active (i.e. during the sweep). With such power management, lower average power consumption may be achieved, while still allowing short periods of higher power consumption. The power store 15 may include a capacitance, and may be restricted by space requirements as well as intrinsic safety requirements (applying when the gauge 1 is arranged in the hazardous zone of a tank with explosive or flammable contents)

Although being shown as separate blocks in FIG. 1, several of the transceiver 10, the processing circuitry 11 and the interface 14 may be provided on the same circuit board, or even in the same circuit.

Figure 2:
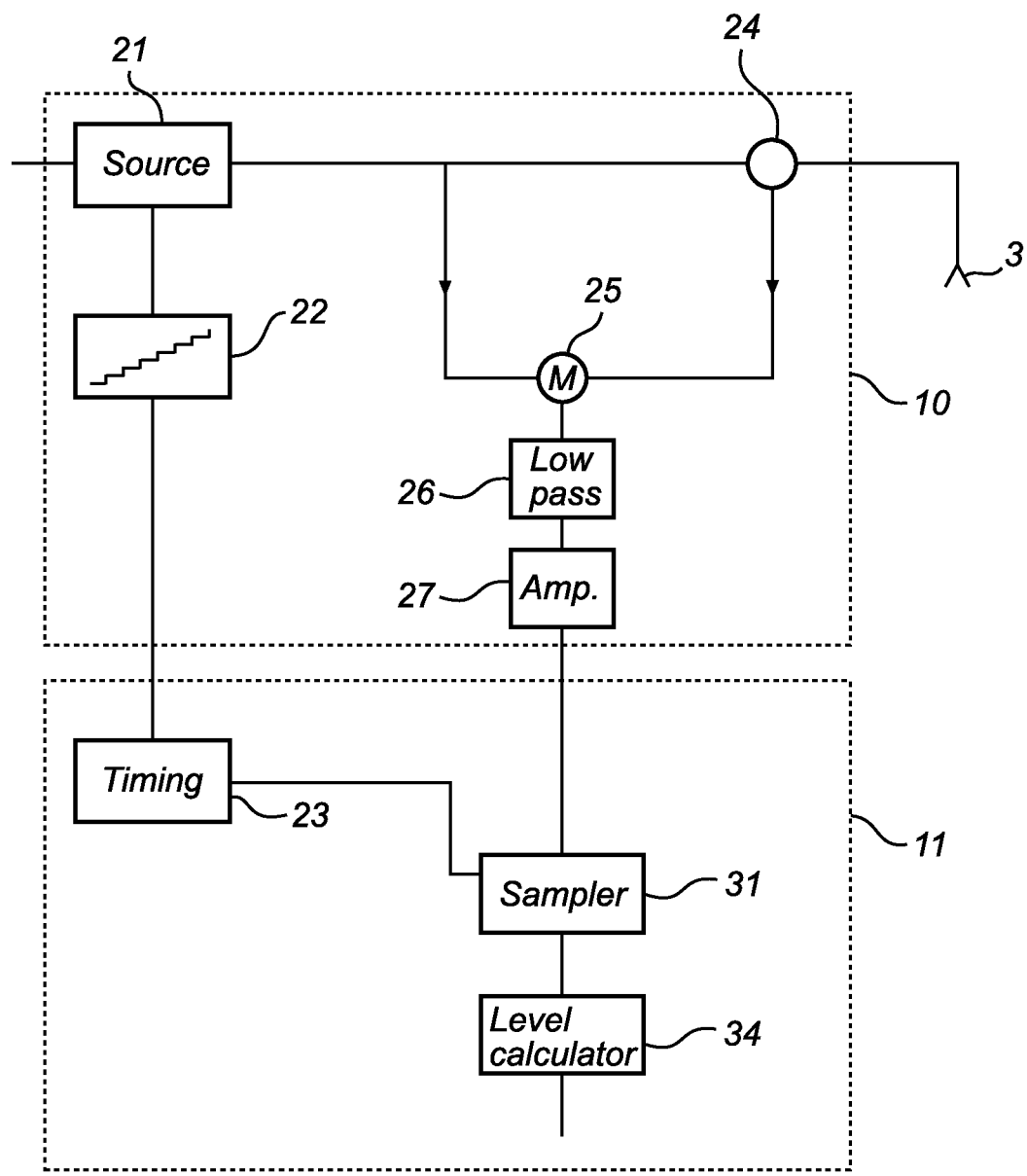
FIG. 2 is a schematic block diagram of a transceiver and processing circuitry in the radar level gauge in FIG. 1, according to an embodiment of the present invention.

Referring now to FIG. 2, there is shown a more detailed block diagram of the transceiver 10 and processing circuitry 11 in FIG. 1 according to an embodiment of the present invention.

The transceiver 10 here includes a microwave source 21 driven by a step generator 22, in turn controlled by timing circuitry 23 forming part of the processing circuitry 11. The microwave source 21 is connected to the antenna 3 via a power divider 24. The power divider 24 is arranged to connect a return signal from the antenna to a mixer 25, which is also connected to receive the signal from the microwave source 21. The mixer output is connected to a low pass filter 26 and an amplifier 27.

The processing circuitry 11 here includes, in addition to the timing circuitry 23 mentioned above, a sampler 31 adapted to receive and sample the signal. The sampler may comprise a sample-and-hold circuit in combination with an ND-converter, or be realized as a sigma-delta converter. The sampler 31 is controlled by the timing circuitry to be synchronized with the measurement signal. Finally, the processing circuitry includes a level calculator block 34 connected to the sampler 31.

While the elements of the transceiver 10 are typically implemented in hardware, and form part of an integrated unit normally referred to as a microwave unit, at least some portions of the processing circuitry are typically embodied by software modules executed by an embedded processor. The invention is not restricted to this particular realization, and any implementation found suitable to realize the herein described functionality may be contemplated.

During operation, the timing circuitry 23 controls the microwave source 21 to output a measurement signal, in an embodiment in the form of a stepped frequency sweep. The measurement signal can normally be stepped from a lower frequency to a higher frequency in suitable steps. In an alternative embodiment the measurement signal may instead be stepped from a higher to a lower frequency, or the frequency steps may even be taken in any order. As an example, the frequency sweep may have a bandwidth in the order of a few GHz (e.g. 0.2-6 GHz), and an average frequency in the order of 25 GHz or 10 GHz. This number of steps N in the sweep may be in the range 100-4000, typically 200-2000, and may be around 1000 for a desired range of 30 m. The size of each frequency step ($\Delta f$) will thus typically be in the order of MHz. For a power limited application the duration of the sweep is limited, and is typically in the order of 0-100 ms. As an example, the duration of the sweep may be around 30 ms, and with 1000 frequency steps (N=1000), this results in a duration for each step in the order to 30 µs, or an update rate of around 30 kHz.

The measurement signal from the microwave source is emitted into the tank 5 by the antenna 3, and the echo signal is returned via the power divider 24 to the mixer 25 where it is mixed with the measurement signal. The mixed signal, referred to as an IF-signal, is filtered by the filter 26 and amplified by amplifier 27 before being supplied to the processing circuitry 11. The IF signal is a piecewise constant oscillating signal, with a frequency proportional to the distance to the reflecting surface and the piecewise constant length is the same length as the measurement signals step length. A typical frequency is in the order of kHz, e.g. less than 100 kHz, and typically less than 15 kHz.

The amplified IF-signal is received by the processing circuitry 11, where it is sampled and ND-converted by the sampler 31. The sampling frequency of the ND-converter 30 is advantageously sufficiently close to the update rate of the measurement signal, in order to sample each step of the measurement signal once and only once.

The sample vector resulting from the sampling is supplied to the level calculator block 34, which determines the frequency of the IF-signal based on the sample vector, and then determines the distance to the reflecting surface (and subsequently the filling level of the product in the tank) based on the IF-signal frequency.

Figure 3:
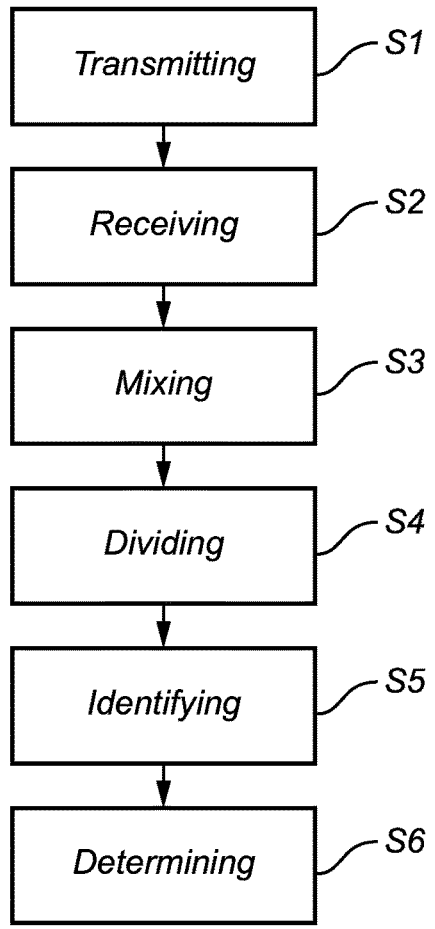
FIG. 3 is a flow chart of the method according to an embodiment of the present invention.

FIG. 3 illustrates a flow chart of how an embodiment of the present invention can be implemented.

First, in step S1, an electromagnetic transmit signal $S_T$ is transmitted by the antenna 3 towards the surface 7. Then, in step S2, a return signal $S_R$ traveling back from the surface 7 is received by the antenna 3 and sent along the waveguide 9 to the transceiver 10. In step S3 the return signal $S_R$ is mixed with the transmit signal $S_T$ by the transceiver 10 comprising the mixer 25 to provide intermediate frequency signal (IF-signal).

Then, in step S4-S6, the distance is determined based on an embodiment of the invention. Where in step S4, the IF-signal is first divided into a plurality of frequency portions by the processing circuitry 11, where each frequency portion corresponds to a frequency interval of the transmitted signal. For example a received signal $S_R$ by the transceiver 10, where the received signal comprises frequencies of 9.0 to 10.6 GHz, would be mixed with the transmitted signal $S_T$, and the resulting IF-signal could be divided into four parts corresponding to 9.0-9.4 GHz, 9.4-9.8 GHz, 9.8-10.2 GHz, and 10.2-10.6 GHz.

Providing a plurality of frequency portions allows the processing circuitry 11 during the next step, S5 to identify disturbed frequency portions which have been affected by narrow-band interferences.

Thus last in step S6, frequency portions being unaffected by narrow-band interference are used to determine a distance to the reflecting surface for each frequency portion. Where the final distance to the reflecting surface can be determined as an average of the distances resulting from each frequency portion which has been identified as unaffected by narrow-band interference.

Figure 4:
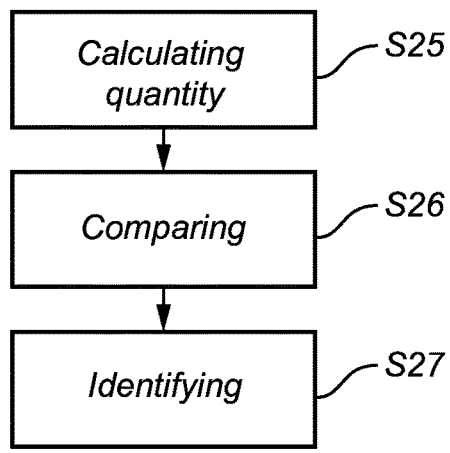
FIG. 4 is a flow chart of parts of a method according to several embodiments of the present invention.

Now referring to FIG. 4, where steps are specified for several embodiments to enable detection and identification of frequency portions being affected and disturbed by narrow-band interference. In step S25, each frequency portion is processed by the processing circuitry 11 to calculate a representative quantity. One example would be to apply signal processing algorithms such as Fast Fourier Transform (FFT) and/or phase calculations. The signal processing algorithms together with a relationship between the transmitted signal $S_T$ and received signal $S_R$ will provide a spectrum based on the frequency domain. Then in step S26, the representative quantity from each frequency portion is compared with all other representative quantities. Following the example above the spectrums from each frequency portion will then be used to calculate an energy measure, frequency spectrums processed from frequency portions being disturbed by narrow-band interference will show differing energy measures compared to frequency portions which are unaffected by narrow-band interferences. Then in step S27, frequency portions which are disturbed by narrow-band interference will be identified as such, which will enable the processing circuitry 11 to determine a distance from each frequency portion being unaffected by narrow-band interference.

As mentioned earlier, the processing of frequency portions in step S25 to calculate a representative quantity are not limited to signal processing algorithms, the representative quantity could be the distance resulting from each frequency portion or the signal amplitude from each frequency portion or for instance the number of samples obtained from each frequency portion.

Furthermore comparing as described in step S26 above should be read in the context of the application also as the possibility to compare the difference between each representative quantity which may be calculated and used, or the representative quantities may just be compared relatively. By calculating and using each representative quantity, a predetermined amount could be set and representative quantities which differ more will be identified in step S27 as being disturbed by narrow-band interference. By relatively the representative quantities could be sorted in order of size and a predefined number of the largest and smallest representative quantities will be identified in step S27 as being disturbed by narrow-band interference, or an average of the representative quantities could be calculated and representative quantities differing more than a certain percentage, for instance one percent, will be identified in step S27 as being disturbed by narrow-band interference.

Although the figures may show a specific order of method steps, the order of the steps may differ from what is depicted. Also two or more steps may be performed concurrently or with partial concurrence. Such variation will depend on the software and hardware s chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A method for providing narrow-band interference unaffected measurement of a distance to a surface of a product kept in a tank, said method comprising;
    transmitting electromagnetic transmit signal towards said surface,
    receiving electromagnetic return signal reflected at said surface,
    mixing said return signal with said transmit signal to provide an intermediate frequency (IF) signal,
    determining said distance, based on said intermediate frequency signal,
    wherein the step of determining said distance further comprises the steps of;
    dividing said intermediate frequency signal into a plurality of time domain portions, wherein each time domain portion corresponds to a frequency interval of said transmit signal,
    identifying disturbed time domain portions as time domain portions of said plurality of time domain portions which are affected by narrow-band interference,
    determining said distance based only on time domain portions of said plurality of time domain portions which are unaffected by narrow-band interference, while disregarding disturbed time domain portions.

2. The method according to claim 1, wherein the step of identifying disturbed time domain portions includes:
    calculating a representative quantity associated with of each time domain portion, and,
    identifying disturbed time domain portions based on said representative quantity.

3. The method according to claim 2, wherein the step of identifying disturbed time domain portions includes:
    comparing each representative quantity with all other representative quantities, and
    determining deviating representative quantities which differ more than a predefined amount from a majority of said all other representative quantities,
    identifying disturbed time domain portions as time domain portions associated with said deviating representative quantities.

4. The method according to claim 2, wherein the step of identifying disturbed time domain portions includes:
    sorting said representative quantities in order of size, and
    identifying disturbed time domain portions as time domains portions associated with a predefined number of the largest and a predefined number of the smallest representative quantities.

5. The method according to claim 4, wherein said predefined number is at least two or less than or equal to half the number of representative quantities.

6. The method according to claim 2, wherein the step of identifying disturbed time domain portions further includes:
    identifying disturbed time domain portions as time domain portions associated with representative quantities differing more than one percent from an average of all representative quantities.

7. The method according to claim 2, wherein the step of calculating a representative quantity comprises:
    processing each time domain portion to provide a frequency spectrum, calculating said representative quantity as an energy measure from each frequency spectrum.

8. The method according to claim 2, wherein the step of calculating a representative quantity further comprises;
processing each time domain portion to calculate said representative quantity as a measure of said distance associated with each frequency portion.

9. The method according to claim 8, wherein said distance is determined as an average of distances associated with time domain portions being unaffected by narrow-band interference.

10. The method according to claim 1, wherein said electromagnetic transmit signal comprises a frequency spectra of 9 to 10.6 GHz.

11. The method according to claim 1, wherein said electromagnetic transmit signal comprises a frequency spectra of 25 to 27 GHz.

12. The method according to claim 1, wherein the IF signal is divided into at least two time domain portions.

13. The method according to claim 1, wherein the step of transmitting said electromagnetic transmit signal includes:
transmitting said electromagnetic transmit signals as a plurality of frequency intervals.

14. A radar level gauge for narrow-band interference unaffected measurement of a distance to a surface of a product kept in a tank, said radar level gauge comprising;
a transmitter configured to transmit electromagnetic transmit signal towards said surface,
a receiver configured to receive electromagnetic return signal reflected from said surface,
a mixer configured to mix said transmit signal and said return signal to provide an intermediate frequency signal,
processing circuitry configured to determine said distance,
said processing circuitry being arranged to;
divide said IF signal into a plurality of time domain portions, wherein each time domain portion corresponds to a frequency interval of said transmit signal,
identify time domain portions of said plurality of time domain portions which are affected by narrow-band interference,
determine said distance based only on time domain portions of said plurality of time domain portions which are unaffected by narrow-band interference, while disregarding disturbed time domain portions.

15. A radar level gauge according to claim 14, wherein the processing circuitry furthermore is configured to;
calculate a representative quantity associated with of each time domain portion, and,
identify disturbed time domain portions based on said representative quantity.

16. A method for providing narrow-band interference unaffected measurement of a distance to a surface of a product kept in a tank, said method comprising;
transmitting electromagnetic transmit signal towards said surface,
receiving electromagnetic return signal reflected at said surface,
mixing said return signal with said transmit signal to provide an intermediate frequency (IF) signal,
dividing said intermediate frequency signal into a plurality of consecutive time domain portions, wherein each time domain portion corresponds to a frequency interval of said transmit signal,
determining which of said plurality of time domain portions that are affected by narrow-band interference and which of said plurality of time domain portions that are unaffected by narrow-band interference,
based on said determining, splitting said plurality of consecutive time domain portions into a first sub-set including time domain portions affected by narrow-band interference, and a second sub-set including time domain portions unaffected by narrow-band interference, and
determining said distance based only on said second sub-set of time domain portions while disregarding disturbed time domain portions.

17. The method according to claim 2, wherein said representative quantity is a distance calculated from each time domain portion.

18. The method according to claim 2, wherein said representative quantity is a signal amplitude from each time domain portion.

19. The method according to claim 2, wherein said representative quantity is a number of samples obtained from each time domain portion.

* * * * *